Figure 1:
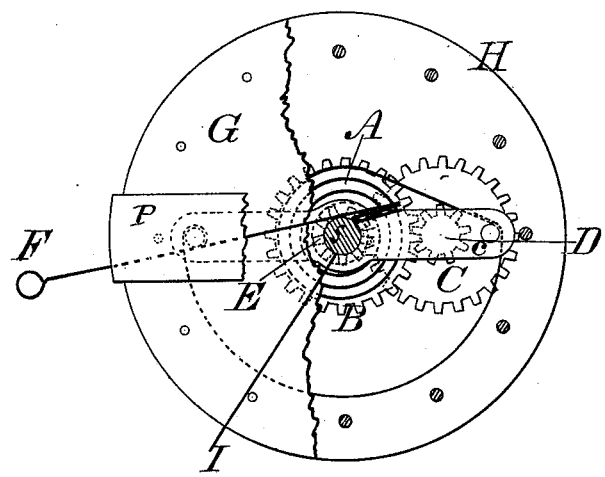
Figure 2:
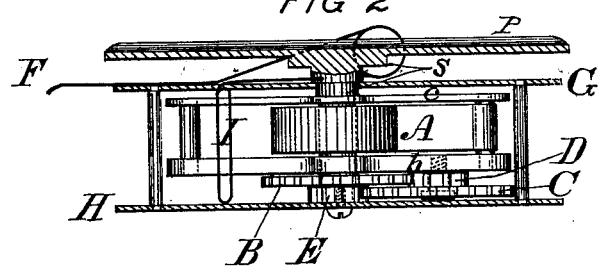

F. A. LOOMIS.
Fishermen's Reel.

No. 235,157.                    Patented Dec. 7, 1880.

WITNESSES                         INVENTOR.

UNITED STATES PATENT OFFICE.

FRANCIS A. LOOMIS, OF ONONDAGA, NEW YORK.

FISHERMAN'S REEL.

SPECIFICATION forming part of Letters Patent No. 235,157, dated December 7, 1880.

Application filed March 1, 1880. (Model.)

*To all whom it may concern:*

Be it known that I, FRANCIS A. LOOMIS, of Onondaga, Onondaga county, State of New York, have invented a new and useful Improvement in Fishermen's Reels, of which the following is a specification.

Heretofore fishermen's reels have been so constructed as to require a crank for winding up or retrieving the line—a process so slow, even with the most elaborate "multipliers," as to be especially vexatious and wearisome to the fisherman, from the frequent fouling of the flies and hooks when casting where water-grasses abound, near which most of the game fishes in our rivers and lakes choose their haunts. The crank-reel is also objectionable because the strain in reeling in the fish is uneven and irregular, thus endangering its loss by the tearing out of the hook or by the breaking of the line. It is objectionable because of its slowness, enabling the fish to gain slack line and thus escape.

The object of my invention is to avoid these objectionable features by providing a reel by which, when casting at any distance, the flies may be recovered or brought to hand without loss of time when it is desired, and which shall be as rapid in its action as a game fish is rapid and eccentric in its movements, readily and rapidly taking up the slack or letting it out with a proper stop or tension at all times on the line.

The construction of my apparatus is as follows: The curved plate P is made like the ordinary reel-plate for affixing it to the rod. From the convex face of this plate, at its center, a stud, *s*, projects at right angles thereto and forms an axis, on which the spool of the reel revolves. This spool is formed of two circular disks or heads, G H, united together by connecting rods or bars around their periphery, and forming a skeleton-spool or otherwise. This spool is held in place on the stud *s* by a screw entering the outer end of the stud. A helical spring, A, is attached at its inner end to the stud, and at its outer end it is connected with a bar that unites two arms, *b c*, which are placed on each side of spring A, and revolve on the central axis, actuated by the spring when wound up. These arms serve to hold the spring in place, and a curved metal band extending from one end of the arms to the other controls the expansion of the spring outward. From one of the arms, *b*, a stud projects parallel with the axis *s*, forming an axis on which a pinion, D, turns, which gears into a spur-wheel, B, fixed stationary on stud *s*, so that when arm *b* revolves the central axis the pinion D is turned with a planetary motion on the axis with D. There is a spur-wheel, C, of equal size with B, which is affixed to and revolves with pinion D. This wheel gears into a pinion, E, of the same size as D, that revolves on the central axis, and is affixed to the spool-plate H, and causes the spool to revolve. By this arrangement of gearing it will be noticed that when the spring A actuates the arms *b c* the spool revolves with an accelerated motion in accordance with the multiplying gearing placed in a compact form within the revolving spool. When the line is wound up on the spool, to which its inner end should be affixed, if it is drawn off, causing the spool to revolve against the action of the spring, the spring is thereby wound up, and when the line is relaxed the spring gives to the spool a rapid movement in the contrary direction and quickly winds on the slack of the line. In consequence of the multiplied gearing the spring will wind on a very long line.

When the line is drawn out to any desired length for the purpose of casting, &c., it is held by means of a brake, F, that prevents the revolution of the spool. This brake is affixed to the central stud, *s*, and projects therefrom in nearly a radial line, bearing against the side of disk G of the spool with force sufficient to prevent its revolving under ordinary strains, or by the action of the spring. This brake can be raised to give the spring or line free action, or it can be pressed down with greater force by the hand to prevent the drawing out of the line. Its position is convenient for manipulating by the hand grasping the pole. There is also another wire or extended radial arm affixed to the central axis outside the spool and turned at right angles over the face of its periphery, forming at that point a loop, I, that serves to guide the line passing through it onto the spool and prevent its running off while being wound up.

By this construction and arrangement of parts I make a light, efficient, automatic fisherman's reel that will readily take up the slack of the line or pay it out, as required, or instantaneously wind it up automatically, which action is at all times under control by the brake.

What I claim, and desire to secure by Letters Patent, is—

1. In an automatic fisherman's reel, the combination of the spool G H, spring A, stationary wheel B, pinion E, and arm *b*, carrying the planet-wheel C and pinion D, all centering on the axis of rotation of the spool, substantially as and for the purpose specified.

2. In an automatic fisherman's reel, the combination of a spring, A, and spool G H, surrounding and moving about the fixed central stud, *s*, and multiplying and planetary gearing, as shown, with the friction-brake F, bearing against said spool and acted upon by the hand of the operator to control the reeling in of the line, substantially as described and shown.

FRANCIS A. LOOMIS.

Witnesses:
CAINS A. WEAVER,
N. M. WHITE.